(12) United States Patent
Holzmann et al.

(10) Patent No.: US 6,568,540 B1
(45) Date of Patent: May 27, 2003

(54) LOW FORCE CLOSURE FILTER WITH INTEGRAL SEAL

(75) Inventors: Mark V. Holzmann, Stoughton, WI (US); Michael J. Connor, Stoughton, WI (US); Robert A. Bannister, Stoughton, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/735,874

(22) Filed: Dec. 13, 2000

(51) Int. Cl.[7] .............................................. B01D 35/30
(52) U.S. Cl. ........................ 210/445; 210/450; 210/495; 210/493.3; 55/497; 55/502; 55/521
(58) Field of Search .................................. 210/445, 450, 210/493.3, 495, 446; 55/502, 497, 521

(56) References Cited

U.S. PATENT DOCUMENTS

| | | | |
|---|---|---|---|
| 3,296,781 A | * | 1/1967 | Schumann ................. 210/453 |
| 3,481,119 A | * | 12/1969 | McKinlay ................. 123/587 |
| 4,128,251 A | | 12/1978 | Gaither et al. |
| 4,938,992 A | | 7/1990 | Mears |
| 4,997,606 A | | 3/1991 | Mears et al. |
| 5,078,765 A | * | 1/1992 | Schollhorn et al. ........... 55/481 |
| 5,256,312 A | * | 10/1993 | Letersky ................. 210/495 |
| 5,447,762 A | | 9/1995 | Loren |
| 5,679,122 A | | 10/1997 | Moll et al. |
| 5,759,217 A | | 6/1998 | Joy |
| 5,853,445 A | | 12/1998 | Wong et al. |
| 5,864,996 A | | 2/1999 | Veldman et al. |
| 5,902,361 A | | 5/1999 | Pomplun et al. |
| 5,913,762 A | | 6/1999 | Matsumoto |
| 5,958,097 A | | 9/1999 | Schlor et al. |
| 6,045,598 A | | 4/2000 | Fath et al. |
| 6,045,600 A | | 4/2000 | Michaelis et al. |
| 6,066,254 A | | 5/2000 | Huschke et al. |

FOREIGN PATENT DOCUMENTS

| | | | | |
|---|---|---|---|---|
| DE | 3837968 | * | 5/1990 | ................. 55/502 |
| NO | 73257 | * | 3/1948 | ................. 210/495 |

OTHER PUBLICATIONS

"Youll Have Everything To Gain" Gas Assist Injection Systems, Gain Technologies, 1999.
"A better way of injection molding—gas-assisted", NitroJection, 1995.
"Easy Processing Makes Design Dreams Come True", Allied Signal Plastics, 1999.
"Contentious Chapter Ends For Gas-Assist Processors", Stephen Moore, Mar., 2000.
"A Gas Solutions Systems Technology Molding", Incoe Gas Injection, 1999.

* cited by examiner

Primary Examiner—Matthew O. Savage

(57) ABSTRACT

A filter (12) has a resiliently compressible thermally and chemically resistive combined unitary frame and gasket member (22) extending along its perimeter (18) and supporting a filter media element (16) and sealed to both the filter media element and the housing (20). One or more flange portions (34, 72, 94, 96, 118, 130) have one or more hollow channels (36, 74, 90, 92, 120, 132) deformed by engagement with the housing and reducing required closure force of the housing thereagainst.

2 Claims, 2 Drawing Sheets

12# LOW FORCE CLOSURE FILTER WITH INTEGRAL SEAL

BACKGROUND AND SUMMARY

The invention relates to filters, and more particularly to frame and gasket embers for structurally supporting and sealing same in a housing.

Filters are currently manufactured in several ways. One way is to pour a foaming urethane around the filter media element, with the urethane performing a support function structurally supporting the filter media element in a filter housing and also performing a sealing function as a gasket sealing the filter media element in the housing. A problem with the urethane seals is that they have limited thermal and chemical resistance. Another way to manufacture filters is to pot or mold the filter media element into a rigid metal or hard plastic frame, and then adhere or place a foam or molded rubber gasket onto the frame to act as the sealing member for the filter in the housing. A disadvantage of the rigid frame filters is that they are costly due to the multiple components, namely the frame member(s) and gasket(s), and the manufacturing labor required to assemble such components together.

The present invention addresses and solves the above noted problems in a simple and effective manner.

In one aspect, the invention enables an integral structurally supportive frame and sealing gasket which is resiliently compressible and thermally and chemically resistive.

In another aspect, the invention provides improved sealing characteristics while at the same time reducing closure force requirements of the housing against the sealing gasket.

In the preferred embodiment, an elastomeric combined unitary frame and gasket member is provided along the perimeter of the filter media element and supports the filter media element and is sealed to both the filter media element and the housing and has a hollow channel formed by gas-assist injection molding. The hollow channel is deformed by engagement with the housing and reduces required closure force.

DETAILED DESCRIPTION

Figure 1:
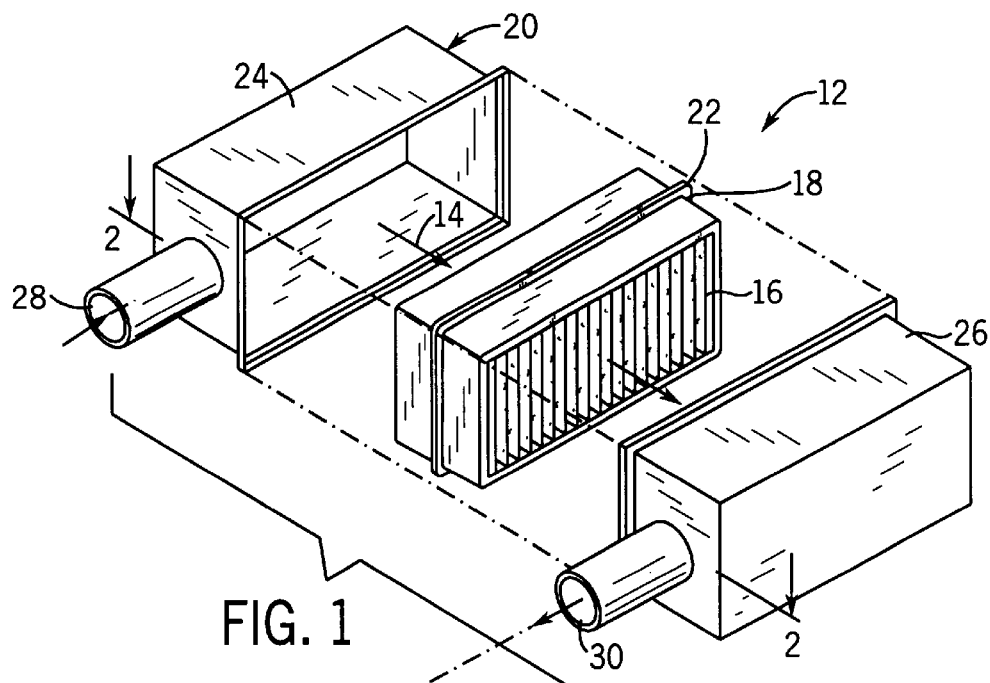
FIG. 1 is an exploded perspective view of a filter constructed in accordance with the invention.
Figure 2:
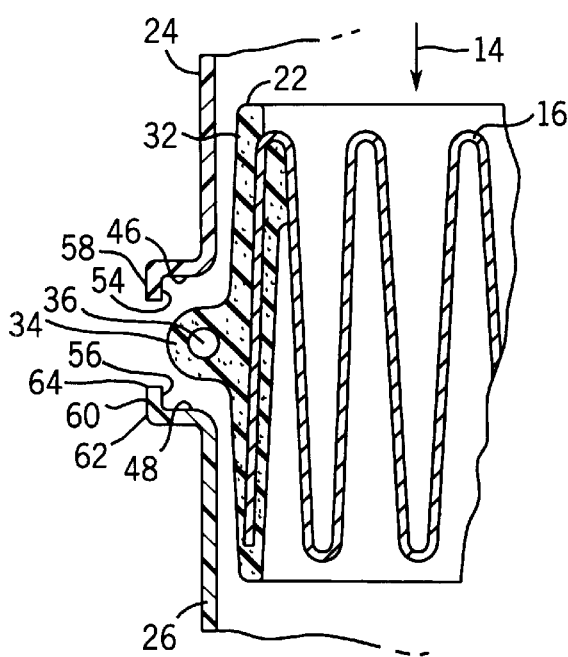
FIG. 2 is a side sectional view taken along line 2—2 of FIG. 1.

FIG. 1 shows a filter 12 for filtering fluid flow along an axial direction 14, FIGS. 1, 2. Filter media element 16 has a perimeter 18 extending therearound for mounting the filter media element in sealed relation in a housing 20. Perimeter 18 defines a lateral plane normal to axial flow direction 14. A resiliently compressible thermally and chemically resistive combined unitary frame and gasket member 22 extends along perimeter 18 and supports filter media element 16 and is sealed to both filter media element 16 and housing 20, between and against the housing members. The housing has mating sections 24 and 26 having inlet 28 and outlet 30, respectively. The housing sections are assembled to each other in any suitable manner, such as bolts, clamps or the like, not shown.

Figure 3:
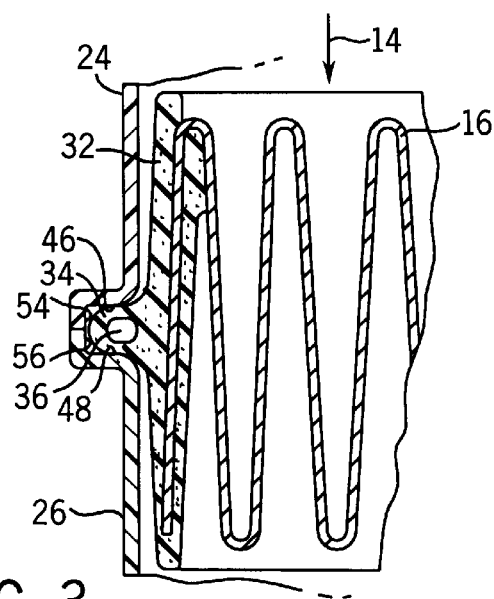
FIG. 3 is like FIG. 2 and shows an assembled condition.

Unitary frame and gasket member 22, FIG. 2, has a structurally supportive portion 32 supporting filter media element 16 and sealed thereto, and a flange portion 34 sealed to the housing, between and against the housing members, FIG. 3. Filter media element 16 may have various known forms, such as layered sheet media, or pleated media as shown in FIGS. 2 and 3. Unitary frame and gasket member 22 is gas-assist injection molded to the filter media element at supportive portion 32 and is formed with a hollow channel 36 at flange portion 34. Gas-assist injection molding is known in the art, for example: Gain Technologies, "You Have Everything To Gain" Gas Assist Injection Systems, 1999; NitroJection, "A better way of injection molding—gas-assist", 1995; Allied Signal Plastics "Easy Processing Makes Design Dreams Come True", 1999; Stephen Moore, "Contentious Chapter Ends For Gas-Assist Processors", March, 2000; Incoe Gas Injection "A Gas Solutions Systems Technology Molding", 1999. Gas-assist injection molding is chosen in the present application because it enables formation of hollow channels, by injection of gas during molding, and because it enables usage of thermally and chemically resistive materials, including elastomeric materials, such as thermal plastic elastomer, e.g. santoprene, for flange portion 34, and thermal plastic elastomer or rigid polymer, e.g. polypropylene, for supportive portion 32, and combinations thereof. The provision of hollow channel 36 is selected to desirably reduce required closure force of the housing thereagainst.

Figure 4:
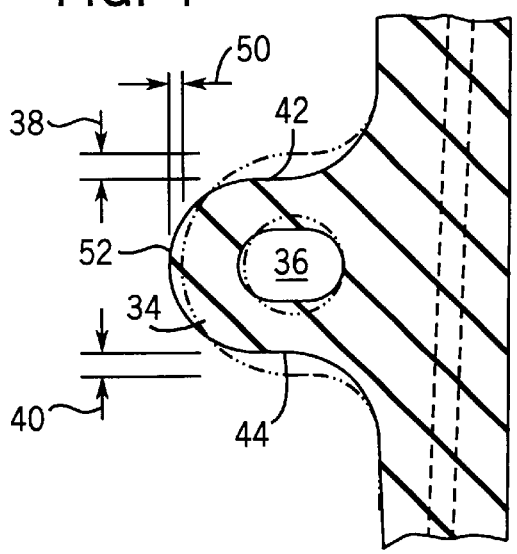
FIG. 4 is an enlarged view of a portion of the structure of FIG. 2.

Hollow channel 36, FIG. 3, is deformed and compressed in the axial direction by the housing. The axial compression is shown at 38 and 40 in FIG. 4, providing axial seals at 42 and 44 against respective axial sealing surfaces 46 and 48 of the housing. The axial compression also causes a flattening and lateral bulging of hollow channel 36 and flange portion 34 as shown at expansion 50, which may provide a lateral seal 52 at lateral sealing surface 54 and/or 56 of the housing to be described.

Mating housing sections 24 and 26 have respective axial sealing surfaces 46 and 48 engaging axially distally opposite sides 42 and 44 of flange portion 34 and applying axial compression force at axially distally opposite ends of hollow channel 36. One or both of housing sections 24 and 26 have a sidewall 58 and 60 having a respective lateral sealing surface 54 and 56. Lateral sealing surface 54 extends from axial sealing surface 46 axially toward axial sealing surface 48 and is spaced laterally outwardly of filter media element 16 by flange portion 34 therebetween. Lateral sealing surface 56 extends from axial sealing surface 48 axially towards axial sealing surface 46 and is spaced laterally outwardly of filter media element 16 by flange portion 34 therebetween. Sidewall 58 and/or 60 at lateral sealing surface 54 and/or 56 engages flange portion 34 and limits lateral outward bulging of the flange portion at hollow channel 36 upon axial compression and deformation at 42 and 44, FIG. 3, to maintain axial seals 42 and 44 at axial sealing surfaces 46 and 48 and also to establish a lateral seal 52 at lateral sealing surface 54 and/or 56. Sidewall 60 extends between lower and upper axially distally opposite ends 62 and 64.

Lower end 62 of sidewall 60 is at axial sealing surface 48. Upper end 64 of sidewall 60 engages housing section 24 and provides an axial stop limiting axial movement of housing sections 24 and 26 towards each other to control axial compression and deformation of hollow channel 36. The axial stop function may additionally or alternatively be performed by sidewall 58.

Figure 5:
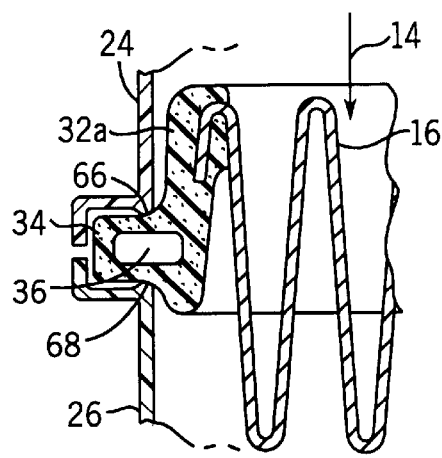
FIG. 5 is like FIG. 2 and shows an alternate embodiment.
Figure 6:
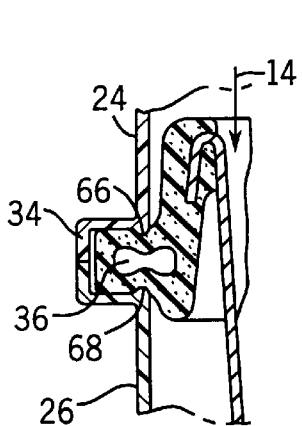
FIG. 6 is like FIG. 5 and shows an assembled condition.

In the embodiment of FIGS. 5 and 6, show another embodiment, and use like reference numerals from above where appropriate to facilitate understanding. Housing sections 24 and 26 have one or more axially projecting ribs such as 66 and 68, respectively, engaging distally opposite sides 42 and 44 of flange portion 34 at hollow channel 36 and deforming sides 42 and 44 towards each other in peanut-shell-shaped configuration, FIG. 6. The ribs engage flange portion 34 at hollow channel 36 and grip the flange portion and localize axial compression force at the hollow channel to focus deformation thereof. FIG. 5 shows a rectangular shaped hollow channel 36 as a further alternative. FIG. 5 also shows a reduced height supportive portion 32a as an alternative to full length supportive portion 32.

Figures 7, 8:
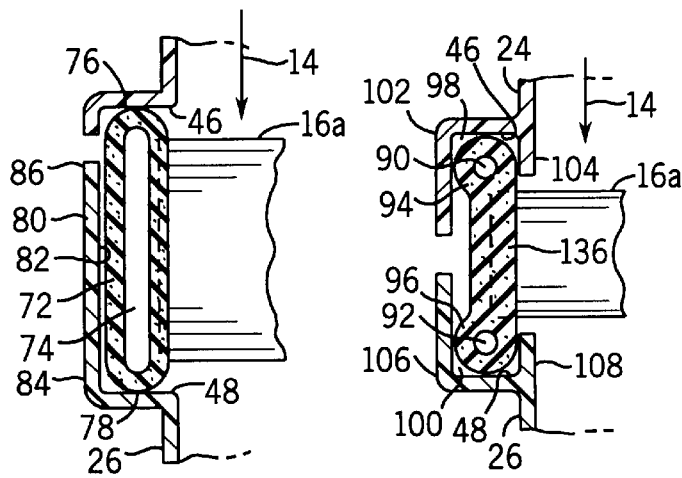
FIG. 7 is like FIG. 2 and shows an alternate embodiment.
FIG. 8 is like FIG. 2 and shows an alternate embodiment.

FIG. 7 shows another embodiment, and uses like reference numerals from above where appropriate to facilitate understanding. Flange portion 72 has a hollow channel 74 elongated in the axial direction. Axial sealing surfaces 46 and 48 of housing sections 24 and 26 engage axially distally opposite ends 76 and 78 of flange portion 72 and apply axial compression force at axially distally opposite ends of axially elongated hollow channel 74. At least one of the housing sections has a sidewall such as 80 having a lateral sealing surface 82 extending from axial sealing surface 48 axially toward axial sealing surface 46 and spaced laterally outwardly of filter media element 16a by flange portion 72 therebetween. Sidewall 80 at lateral sealing surface 82 engages flange portion 72 between the ends of axially elongated hollow channel 74 and limits lateral outward bulging of flange portion 72 at axially elongated hollow channel 74 upon axial compression and deformation at ends 76 and 78, to maintain axial seals at 76 and 78 at axial sealing surfaces 46 and 48 and to establish a lateral seal at lateral sealing surface 82. The filter element may be pleated filter media 16 as shown above, or may be layered sheet media as shown at 16a. Sidewall 80, FIG. 7, extends between axially distally opposite ends 84 and 86. End 84 of sidewall 80 is at axial sealing surface 48. End 86 of sidewall 80 engages housing section 24 and limits axial movement of housing sections 24 and 26 towards each other to control axial compression and deformation of axially elongated hollow channel 74. Lateral sealing surface 82 along sidewall 80 and axial sealing surface 48 define an L-shaped pocket receiving flange portion 72 at axially elongated hollow channel 74.

FIG. 8 shows another embodiment, and uses like reference numerals from above where appropriate to facilitate understanding. Two hollow channels 90 and 92 are spaced from each other along axial direction 14 in respective axially spaced flange portions 94 and 96. Housing sections 24 and 26 have respective pockets 98 and 100 facing each other and respectively receiving flange portions 94 and 96. Pocket 98 has axial sealing surface 46 engaging flange portion 94 at hollow channel 90 and applying axial compression deformation force thereagainst. Pocket 98 has lateral sidewall structure 102, 104 supporting and limiting lateral bulging of flange portion 94 at hollow channel 90 upon axial compression deformation thereof. Pocket 100 has lateral sidewall structure 106, 108 supporting and limiting lateral bulging of flange portion 96 at hollow channel 92 upon axial compression deformation thereof. The noted lateral sidewall structure of pocket 98 includes a pair of laterally spaced walls 102, 104 receiving flange portion 94 therebetween and extending from axial sealing surface 46. The lateral sidewall structure of pocket 100 has a pair of laterally spaced walls 106, 108 receiving flange portion 96 therebetween and extending from axial sealing surface 48. Walls 102 and 104 of pocket 98 extend axially from axial sealing surface 46 and define a U-shaped pocket. Walls 106 and 108 of pocket 100 extend axially from axial sealing surface 48 of pocket 100 and define a U-shaped pocket.

Figure 9:
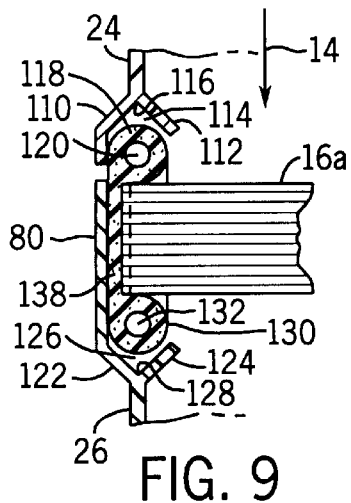
FIG. 9 is like FIG. 2 and shows an alternate embodiment.

FIG. 9 shows another embodiment, and uses like reference numerals from above where appropriate to facilitate understanding. Walls 110 and 112 of pocket 114 extend axially and laterally from the axial sealing surface provided at the bases or root ends 116 of such diverging walls and define a Y-shaped pocket receiving flange portion 118 having hollow channel 120. Walls 122 and 124 of pocket 126 extend axially and laterally from the axial sealing surface formed by the bases or roots 128 of such divergent walls of pocket 126 and define a Y-shaped pocket receiving flange 130 having hollow channel 132.

Figure 10:
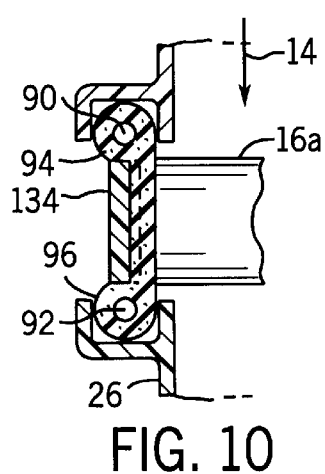
FIG. 10 is like FIG. 2 and shows an alternate embodiment.

FIG. 10 shows another embodiment, and uses like reference numerals from above where appropriate to facilitate understanding. A backstop 134 is provided axially between flange portions 94 and 96 for supporting axial compression and deformation of hollow channels 90 and 92. Backstop 134 can be a separate member of a material hardness stiffer than flange portions 94 and 96. Alternatively, the backstop can be provided by the structurally supportive portion 136, FIG. 8, extending as a web axially between flange portions 94 and 96. Web 136 is integrally formed with flange portions 94 and 96, and in the noted gas-assist injection molding, for example with two injection nozzles or guns, may have a material hardness stiffer than flange portions 94 and 96. For example, the material of flange portions 94 and 96 may be controlled to be a thermal plastic elastomer such as santoprene, or have a higher or dominant ratio thereof, while the material of web 136 is controlled to be a rigid polymer such as polypropylene or have a higher or dominant ratio thereof. Likewise in FIG. 9, web 138 may have a stiffer material hardness than flange portions 118 and 130.

Figure 11:
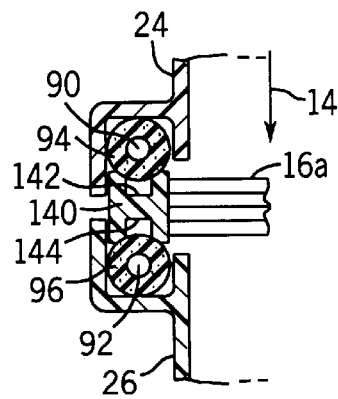
FIG. 11 is like FIG. 2 and shows an alternate embodiment.

FIG. 11 shows another embodiment, and uses like reference numerals from above where appropriate to facilitate understanding. As noted above, backstop 134, FIG. 10, can be a separate member of a material hardness stiffer than flange portions 94 and 96. In FIG. 11, the noted backstop is provided by a rigid thermal plastic polymer frame member 140 which also supports filter media element 16a. Frame member 140 is H-shaped and has distally axially oppositely facing bights 142 and 144 respectively receiving flange portions 94 and 96 having respective hollow channels 90 and 92. The flange portions are preferably molded on top of and/or around frame member 140 to form a singular bonded part.

In the two channel versions, it is preferred that the hollow channels such as 90 and 92 be on axially distally opposite sides of the filter media element, though other configurations are possible. Flange portions 94 and 96 and web 136 therebetween form a barbell configuration. The unitary frame and gasket member provided by web 136 and flange portions 94 and 96 is permanently mounted and sealed to the filter media element, and is releasably mounted and sealed to the housing. It is preferred that a combined unitary frame and gasket member be provided having both the noted structurally supportive portion and the noted one or more flange portions, however in some implementations it may be desirable to provide only the gasket member flange portion having the noted desirable sealing properties in the housing.

It is recognized that various equivalents, alternatives and modifications are possible within the scope of the appended claims.

What is claimed is:

1. A filter for filtering fluid flow along an axial direction comprising a filter media element filtering fluid flowing axially therethrough, said filter media element having a perimeter extending therearound for mounting said filter media element in sealed relation in a housing, a resiliently compressible thermally and chemically resistive combined unitary frame and gasket member extending along said perimeter and supporting said filter media element and sealed to both said filter media element and said housing, wherein said unitary frame and gasket member has a structurally supportive portion supporting said filter media element and sealed thereto, and a flange portion sealed to said housing, said flange portion of said unitary frame and gasket member has a hollow channel deformed by engagement with said housing and reducing required closure force of said housing thereagainst and permitting said flange portion and said structurally supportive portion to be formed of thermally and chemically resistive material and to be integrally formed, said hollow channel is deformed and compressed in said axial direction by said housing, said housing has first and second mating sections having respective first and second axial sealing surfaces engaging axially distally opposite sides of said flange portion and applying axial compression force at axially distally opposite sides of said hollow channel, said first section having a sidewall extending from said first axial sealing surface axially toward said second axial sealing surface and spaced laterally outwardly of said filter media element by said flange portion therebetween, and said sidewall and said first axial sealing surface define an L-shaped pocket receiving said flange portion at said hollow channel.

2. A filter for filtering fluid flow along an axial direction comprising a filter media element filtering fluid flowing axially therethrough, said filter media element having a perimeter extending therearound for mounting said filter media element in sealed relation in a housing, a gasket member extending along said perimeter and sealing said filter media element to said housing, said gasket member having a flange portion with a hollow channel deformed by engagement with said housing and reducing required closure force of said housing thereagainst, wherein said hollow channel is deformed and compressed in said axial direction by said housing, said housing has first and second mating sections having respective first and second axial sealing surfaces engaging axially distally opposite sides of said flange portion and applying axial compression force at axially distally opposite ends of said hollow channel, said first section having a sidewall extending from said first axial sealing surface axially toward said second axial sealing surface and spaced laterally outwardly of said filter media element by said flange portion therebetween, and said sidewall and said first axial sealing surface define an L-shaped pocket receiving said flange portion at said hollow channel.

* * * * *